Oct. 11, 1932.    G. W. PIERCE    1,882,393
MAGNETOSTRICTIVE VIBRATOR
Original Filed March 23, 1928

Inventor
George W. Pierce
by David Rines
Attorney

Patented Oct. 11, 1932

1,882,393

UNITED STATES PATENT OFFICE

GEORGE WASHINGTON PIERCE, OF CAMBRIDGE, MASSACHUSETTS

MAGNETOSTRICTIVE VIBRATOR

Original application filed March 23, 1928, Serial No. 264,222. Divided and this application filed August 9, 1932. Serial No. 628,043.

The present invention relates to magnetostrictive vibrators. The present application is a division of application Serial No. 264,222, filed March 23, 1928, and a continuation in part of application Serial No. 158,452, filed January 3, 1927, which matured, on March 11, 1930, into Letters Patent No. 1,750,124.

A magnetostrictive vibrator comprises a magnetostrictive core disposed in an electro-magnetic field, such as may be established by passing an electric current through a field coil or winding. The core may be in the form of a rod or tube, or any other desired form. Any material having suitable properties may be used for the core, but the material should obviously be characterized by comparatively large magnetostrictive effects and comparatively low vibrational decrement.

The chief object of the present invention is to provide a new and improved magnetostrictive vibrator.

Other objects will be explained hereinafter and will be particularly pointed out in the appended claims, it being understood that it is intended to set forth, by suitable expression in the claims, all the novelty that the invention may possess.

Figure 1:
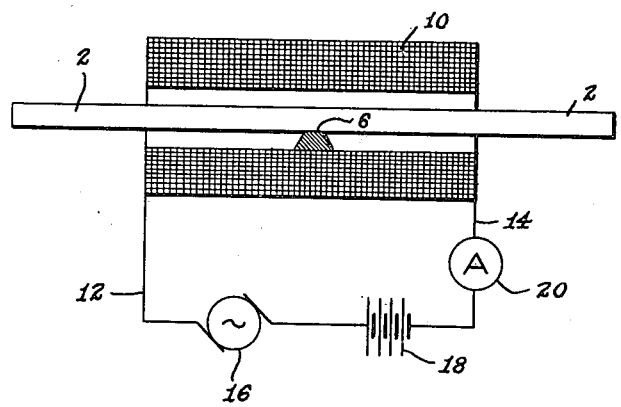
Figure 2:
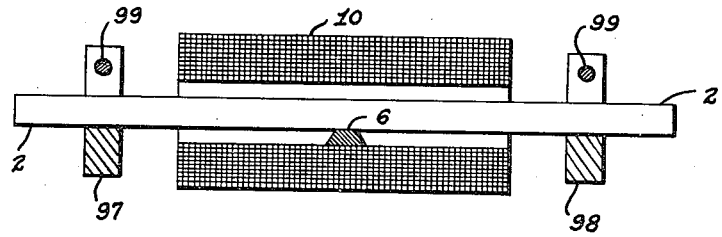

The invention will be explained in greater detail in connection with the accompanying drawing, in which Fig. 1 is a diagrammatic view of a magnetostrictive vibrator embodying the present invention; and Fig. 2 is a similar view of a modification.

A magnetostrictive core is axially positioned within, and driven by, a solenoid field coil or winding 10, with clearance to permit free vibrations. The coil 10 is provided with conductors 12 and 14 by which it may be connected, for simplicity, in series with a source of alternating electromotive force, such as an alternating-current generator 16. A local battery 18 (shown in series with the source 16 and the winding 10) applies a steady magnetizing or polarizing field to the core, over which the alternating field produced by the generator 16 is superposed. Further details will be found in the above-mentioned Letters Patent.

If the current or voltage is alternating, the electromagnetic field created thereby will also be alternating. The core 2 will, therefore, increase and decrease in length (let us say) many times a second. The core 2 will, in consequence, vibrate mechanically by magnetostriction about a nodal point at its center with a period of vibration equal to the period of the alternating electromotive force. The mechanical damping of the rod, mounted as shown, is as small as possible, with the result that the resonant response of the core is very sharp and pronounced.

The frequency of a particular mode of vibration of a rod or bar is determined by its elasticity, length and density. For some modes of vibration, the frequency is affected also by the width, thickness, radius, and the like of the rod or bar. Different bodies, therefore, have different magnetostrictive properties. Any material having suitable properties may, of course, be used for the vibrating body 2, but it should obviously be constituted of material that is suitably magnetizable. The core may be in the form of a simple rod or tube of the proper material, or it may have any other desired form, as stated in the said Letters Patent No. 1,750,124; but to obtain the best results, depending upon the purpose for which the apparatus is used, the core or tube should be characterized by comparatively large magnetostrictive effects and comparatively low vibrational decrement. By filing the vibrator down, or adding to its mass by solder or plating, or by adding weights, as hereinafter described, any desired frequency may readily be attained, either high or low. The vibrator may have weights rigidly attached to the ends thereof, as illustrated in the said Letters Patent, or the weights may be adjustable, as in the form of split collars 97, 98, which may be clamped in adjusted position by screws or the like 99. These expedients effectively decrease the period of vibration to comparatively low adjustable values. Alloys containing nickel, chromium, cobalt and steel, in proper proportions, have comparatively large magnetostriction.

In addition to one or more natural fundamental frequencies of mechanical vibration, the core has also frequencies of vibration determined by the operation of the core in halves, thirds, fourths, fifths and other overtones. There will usually, therefore, be more than one specific frequency of magnetization at which the core will resonate as above described. Such other modes of vibration may be produced by particular methods of stimulating the vibrations, or by particular modes of clamping the body.

And, of course, it will be understood that the invention is not restricted to the use of vibrators in the form of tuned rods or tuned tubes. As a further example, the tuned vibrator may be constituted of a plurality of small wires embedded as a unit in a highly elastic binding material, or attached together by solder or by welding in suitable spots, as at their centers or ends. A core of this character will reduce hysteresis and eddy currents, which would act in a detrimental manner at high frequencies.

At frequencies as high as 200,000 cycles per second, a solid nickel-steel, michrome, or chromium-steel rod is highly efficient even when its diameter is as large as one inch, and though used in magnetizing coils that have a clearance of more than ¼ inch all around the core. By diminishing this clearance and using cores of smaller diameter and shorter lengths, the upper limit of frequency can be greatly raised, and then properly constructed comminuted cores with elastic binding material will serve still further to raise the limit of available frequencies.

It will be noted that when vibrating at its fundamental frequency, the two halves of the centrally supported core are driven by equal and oppositely acting forces, so as to communicate practically no motion to the clamp and its base. The apparatus is, therefore, free from one of the sources of trouble and irregularity of tuning forks, the periods of vibration of which are affected by the table or other support on which they are placed.

So well does the present vibrator balance itself about a central pivot 6 that the clamp, between which the core is shown centrally clamped in the said Letters Patent, may be dispensed with and a mere rest 6 take its place, upon which the core freely rests centrally. With this arrangement the frequencies may be changed at will by merely pulling out one rod and replacing it by another. The core may be otherwise supported also.

To persons skilled in the art many other applications and modifications of the apparatus will occur, and no effort has here been made to be exhaustive.

What is claimed is:

1. Apparatus of the character described comprising a support, a magnetostrictive vibrator freely supported thereon so that it readily may be interchanged for another vibrator, and a coil cooperatively related to the vibrator, the relation between the coil and the vibrator being such that the current flowing through the coil is subjected to the reaction of the vibrator due to the magnetostrictive effects.

2. Apparatus of the character described comprising a support, a magnetostrictive vibrator freely supported centrally thereon, and a coil cooperatively related to the vibrator, the relation between the coil and the vibrator being such that the current flowing through the coil is subjected to the reaction of the vibrator due to magnetostrictive effects, whereby the vibrator will be caused to vibrate symmetrically about its center.

3. A magnetostrictive vibrator comprising a magnetostrictive core, and a coil cooperatively related to the vibrator, the relation between the coil and the vibrator being such that the current flowing through the coil is subjected to the reaction of the vibrator due to magnetostrictive effects, a weight attached to the vibrator, and means for adjusting the weight.

In testimony whereof, I have hereunto subscribed my name.

GEORGE W. PIERCE.